US012812422B2

(12) United States Patent
Jalkanen et al.

(10) Patent No.: US 12,812,422 B2
(45) Date of Patent: Nov. 24, 2026

(54) METHOD AND APPARATUSES FOR ENHANCING END-USER EXPERIENCE OF A SUBSCRIBER MOVING FROM A HOME NETWORK TO A VISITED NETWORK

(71) Applicant: Telia Company AB, Solna (SE)

(72) Inventors: Tero Jalkanen, Tuusula (FI); Tomi Sarajisto, Helsinki (FI)

(73) Assignee: Telia Company AB, Solna (SE)

( * ) Notice: Subject to any disclaimer, the term of this patent is extended or adjusted under 35 U.S.C. 154(b) by 444 days.

(21) Appl. No.: 18/242,161

(22) Filed: Sep. 5, 2023

(65) Prior Publication Data

US 2024/0080685 A1 Mar. 7, 2024

(30) Foreign Application Priority Data

Sep. 5, 2022 (SE) .................................... 2251018-4

(51) Int. Cl.
*H04W 8/08* (2009.01)
*H04W 24/08* (2009.01)

(52) U.S. Cl.
CPC ............. *H04W 24/08* (2013.01); *H04W 8/08* (2013.01)

(58) Field of Classification Search
None
See application file for complete search history.

(56) References Cited

U.S. PATENT DOCUMENTS

2021/0258866 A1 8/2021 Chou
2022/0022026 A1 1/2022 Sharma et al.

FOREIGN PATENT DOCUMENTS

CN 106572482 A * 4/2017 ............ H04W 24/02
CN 113068173 A 7/2021
WO WO 2021/071298 A1 4/2021
WO WO 2021/172810 A1 9/2021
WO WO 2021/244763 A1 12/2021
WO WO 2022/026482 A1 2/2022

(Continued)

OTHER PUBLICATIONS

3GPP TR 23.700-81 v0.3.0 , Study of Enablers for Network Automation for 5G 5G System (5GS); Phase 3 (Release 18),2022 (Year: 2022).*

(Continued)

*Primary Examiner* — Said M Elnoubi

(74) *Attorney, Agent, or Firm* — Burr & Forman LLP; Nathaniel T. Quirk, Esq.

(57) ABSTRACT

The embodiments herein relate to a method performed by a network node of a HPLMN, the method including collecting, from at least one radio network node of a RAN, and from a CN, data regarding usage patterns of a subscriber of said HPLMN; analyzing the collected data and filtering the collected data; receiving, via the CN, a request from a network node of a VPLMN; requesting data regarding usage patterns of the subscriber that has moved from the HPLMN to the VPLMN; and providing the network node of the VPLMN, the analyzed and filtered collected data regarding requested usage patterns of the subscriber, for enabling the network node of the VPLMN to adapt core network resources and radio network resources for providing services to the subscriber in the VPLMN.

14 Claims, 7 Drawing Sheets

(56) References Cited

FOREIGN PATENT DOCUMENTS

WO WO 2022/118083 A1 6/2022

OTHER PUBLICATIONS

European Search Report, European Patent Office, Application No. EP 23 19 5390, Jan. 30, 2024.
3rd Generation Partnership Project; Technical Specification Group Services and System Aspects; Study of Enablers for Network Automation for 5G System (5GS); Phase 3 (Release 18—3GPP TR 23.700-81 (May 2022).
SA WG2 Meeting #S2-135, Oct. 14 -18, 2019, Split, Croatia, S2-1909287, New Kls For Data Collection and Analytics Exposure in Intra-PLMN Roaming Scenario, Huawei, HiSilicon.
Swedish Search Report, Jun. 3, 2023, Patent Application No. SE 2251018-4, Swedish Patent and Registration Office.

* cited by examiner

METHOD AND APPARATUSES FOR ENHANCING END-USER EXPERIENCE OF A SUBSCRIBER MOVING FROM A HOME NETWORK TO A VISITED NETWORK

TECHNICAL FIELD

The present disclosure relates to the field of wireless communications, and in particular to methods and apparatuses for providing enhanced end user experience to a subscriber moving from a home network to a visited network.

BACKGROUND

Wireless communication systems are rapidly growing in usage. In recent years, wireless devices such as smart phones and tablet computers have become increasingly sophisticated. In addition to supporting telephone calls, many mobile devices provide access to the internet, email, text messaging, and navigation using the global positioning system (GPS) and are capable of operating sophisticated applications that utilize these functionalities. Radio access technologies also are improving for providing advanced services to wireless devices or user equipments around the world.

The fifth generation (5G) mobile communications system also known as new radio (NR) provides a higher level of performance than the previous generations of mobile communications system. 5G mobile communications has been driven by the need to provide ubiquitous connectivity for applications as diverse automotive communication, remote control with feedback, video downloads, as well as data applications for Internet-of-Things (IoT) devices, machine type communication (MTC) devices, etc. 5G wireless technology brings several main benefits, such as faster speed, shorter delays, and increased connectivity. The third-generation partnership project (3GPP) provides the complete system specification for the 5G network architecture, which includes at least a radio access network (RAN), core transport networks (CN) and service capabilities.

When a user or a home subscriber of a network operator moves from a home network to a visited network operated by another operator, the user or subscriber expects at least the same level of user experience of services as in the home network. Operators usually have agreements and connectivity (of signalling and bearer) between them to enable the provision of services to subscribers moving from a home network to a visited network. Connectivity can be direct between operators (e.g., between operators in the same country or between neighboring countries) or it can be via international hub (e.g., between countries that are geographically far away such as located on different continents). Operators usually maintain agreements with more than one operator. It allows reliability as well as robustness in the connectivity offered to their home subscribers. An example of such agreement is known as a roaming agreement.

The home network of an operator is increasingly able to learn use patterns of an individual home subscriber, related to details such as amount of data, voice calls and services/applications used during a normal day etc. This data can be turned into automatic dynamic optimization of network resources for example based on the time of the day and location, related to issues such as whether "big chunk" of user plane and low latency is required to be reserved by the home network operator or not. There is a lot of drive by network vendors as well as network operators to include these kind of automated dynamic "elastic distributed network functions" into the 5G networks. Also, 3GPP (Third Generation Partnership Project) standardization is active in this area, so at least some standardized tools and processes are/will be available.

However, this data information and how it is exploited is typically only available to the home network operator. As a result, when a home subscriber moves or roams to a visited network of another operator, there is no guarantee that the home subscriber experiences the same level and same quality of used services in the visited network in terms of at least allocation of core network resources and radio network resources thereby a risk that the user experience in the visited network is not satisfactory as expected by the moving home subscriber.

Thus, there is a need for apparatuses, methods, and a program product for improving the user experience of a home subscriber moving from a home operator network to a visited operator network.

SUMMARY

It is an object of embodiments herein to solve the above problem(s) by providing a network node of a home network operator and a method thereof; a network node of a visited network operator and a method thereof for improving user experience of a home subscriber moving or roaming from a home network to a visited network.

According to an aspect of embodiments herein, there is provided a method performed by a network node of a home network operator according to any of the embodiments disclosed herein According to another aspect of embodiments herein, there is provided a method performed by network node of a visited network operator according to any of the embodiments disclosed herein.

According to another aspect of embodiments herein, there is provided a network node of a home network operator according to any of the embodiments disclosed herein.

According to another aspect of embodiments herein, there is provided a network node of a visited network operator according to any of the embodiments disclosed herein.

There is also provided a computer program comprising instructions which when executed on at least one processor of the network node(s) according to embodiments herein, cause the at least one processor to carry out the method of the method describe above. Also, a carrier containing the computer program of is provided, wherein the carrier is one of a computer readable storage medium; an electronic signal, optical signal, or a radio signal.

An advantage of embodiments herein is to improve user experience of a home subscriber moving from a home network to a visited network.

Another advantage of embodiment of embodiments herein is to provide network node(s) of the home network operator respectively the visited network operator with an intelligent mechanism to at least determine efficiently the allocation of core network resources and radio network resources for a subscriber moving from the home network to a visited network and vice versa i.e., if a subscriber moves from a visited network to a home network.

BRIEF DESCRIPTION OF THE DRAWINGS

Examples of embodiments herein are described in more detail with reference to attached drawings in which.

DETAILED DESCRIPTION

In the following, a detailed description of the exemplary embodiments is described in conjunction with the drawings, in several scenarios to enable easier understanding of the solution(s) described herein.

Figure 1:
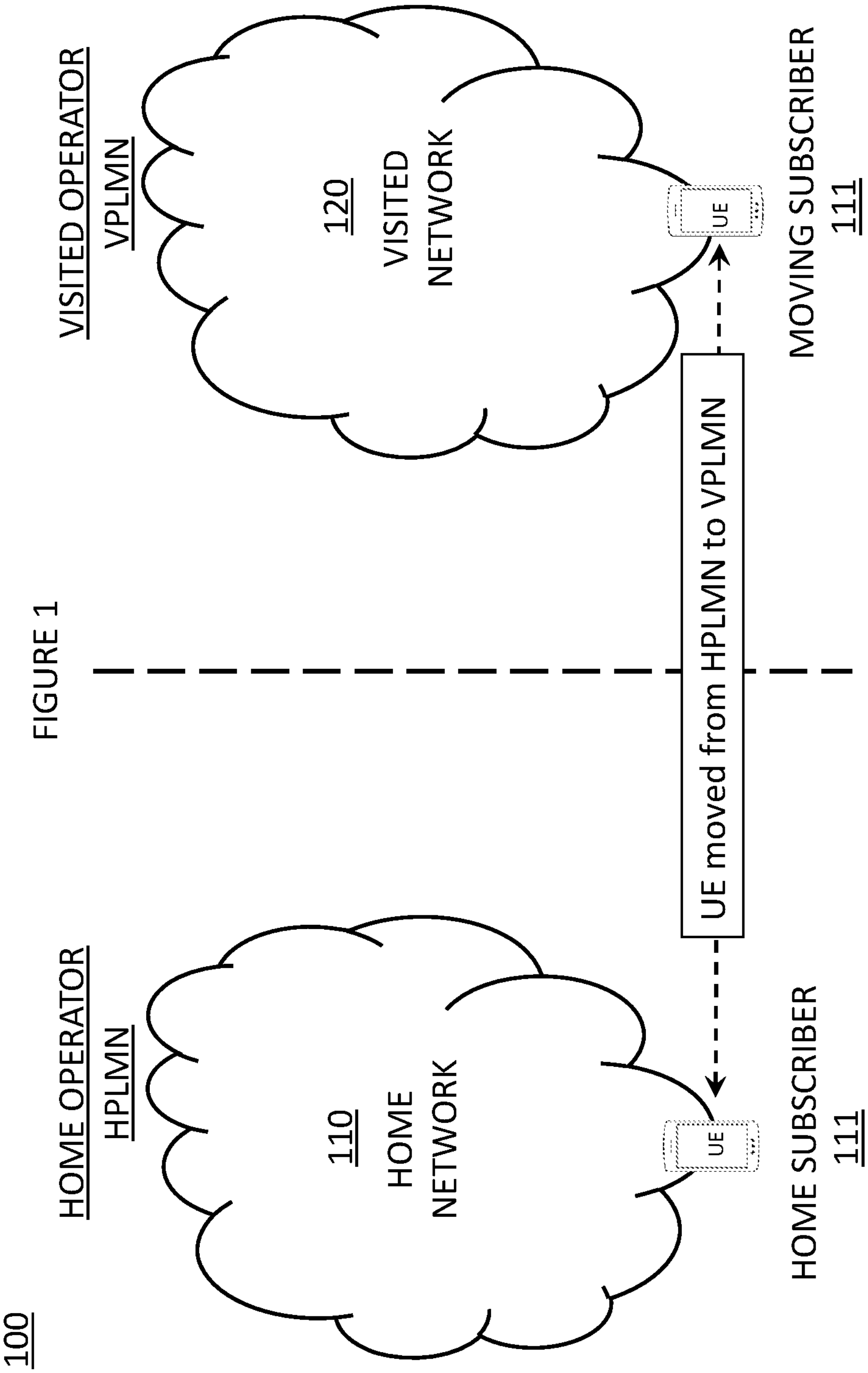
FIG. 1 illustrates a simplified example of a network scenario wherein embodiments herein may be applied.

Referring to FIG. 1 there is illustrated a network scenario 100 involving a home network 110 of a home operator, also known as a HPLMN (Home Public Landline Mobile Network); and a visited or visiting network 120 of a visited operator, also known as VPLMN (Visiting Public Land Mobile Network). Also illustrated is a User Equipment 111 of a (home) subscriber moving from the HPLMN 110 to the VPLMN 120. The home and visited networks may be located in the same country, or in different countries in which case a home subscriber is referred to as a roaming subscriber when in the visited network. The embodiments of the present invention are hence applicable in both scenarios, thereof the use of the term "moving" which also may imply "roaming".

In a roaming scenario, the following terminology can be used:

Home subscriber roaming in a visited network: This subscriber will be an Inbound Roamer for the visited network and an Outbound Roamer for the home network Visiting subscriber roaming in a home network: This visiting subscriber will be an Inbound Roamer for the home network and an Outbound Roamer for the visited network Through InboundRoaming, the visited network operator grants access and consumption of its resources to the roaming subscribers from the home network.

Outbound Roaming allows home subscribers to access the visited network services as per the roaming pack provisioned by the home network operator.

In 3GPP there are defined interfaces between operators for signalling purposes. As an example, in 5G Standalone Architecture (SA) (roaming) interfaces such as N32 is used to carry signalling between 5G core networks to connect nodes of different network operators. For a UE to connect in a network being a home network or a visited network, the UE communicates with an access network which comprises one or more radio network nodes such as base stations such as gNBs (in 5G) or eNodeBs (in 4G) or NodeBs (in 3G).

Figure 2:
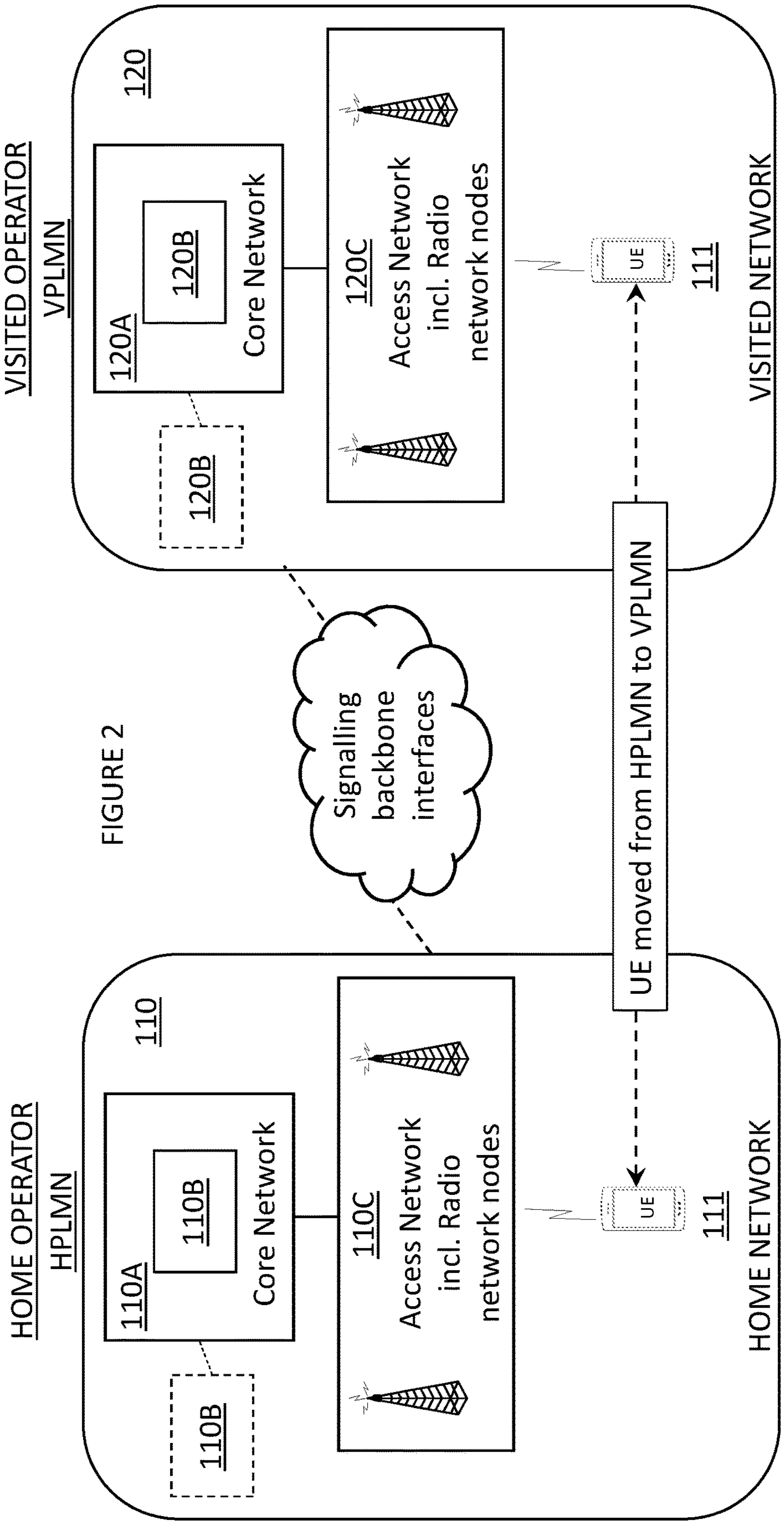
FIG. 2 illustrates another simplified example of a network scenario wherein embodiments herein may be applied.

FIG. 2 illustrates a more detailed network scenario as compared to network scenario of FIG. 1. As shown, the home network HPLMN 110 and the visited network VPLMN 120 each includes a core network 110A, 120A, and an access network 110C, 120C respectively. The access network is also known as the radio access network (RAN) and comprises a plurality of radio base stations or radio network nodes (eNBs, or gNBs etc.) for wireless communication with the UEs. According to embodiments herein, the home network HPLMN 110 comprises a network node 110B which may be a node in the core network 110A or be connected to the core network 110A as shown in FIG. 2. Similarly, the visited network VPLMN 120 also comprises a network node 120B in the core network 120 or is connected to the core network 120. FIG. 2 also depicts a signalling backbone including interfaces for signalling between the home network 110 and the visited network 120. Example of such an interface is the 5G SA N32 interface that configured to carry signalling between 5G core networks.

The network node 110B of the HPLMN 110, according to embodiments herein, comprises an Artificial Intelligence/Machine Learning (AI/ML) platform for big data analysis and for gathering information or data regarding usage pattern(s) of a subscriber 111 of the home network 110. The network node 110B may also comprise a Network Data Analytics Function (NWDAF), NWDAF is a 3GPP standard method used to collect data from user equipments, network functions, and operations, administration, and maintenance (OAM) systems, etc. from the 5G Core, Cloud, and Edge networks that can be used for analytics. In 5G the following use cases involving formula-based/AI-ML analytics using NWDAF are listed:

- Load-level computation and prediction for a network slice instance.
- Service experience computation and prediction for an application/UE group.
- Load analytics information and prediction for a specific NF (Network Function).
- Network load performance computation and future load prediction.
- UE Expected behavior prediction.
- UE Abnormal behavior/anomaly detection.
- UE Mobility-related information and prediction.
- UE Communication pattern prediction.
- Congestion information—current and predicted for a specific location.
- Quality of service (QoS) sustainability involves reporting and predicting QoS change.

An example use case of one of the NWDAF would be to send Key Performance Indicators (KPIs) to a policy control function to decide about security on a noisy node or determine if Quality of Service (QoS) is unequal across subscribers in a cell. Each logical data analytics module is implemented as multiple instances for different use cases and purposes.

For instance, the Big Data module in the management and orchestration layer could be implemented as multiple instances per domain (e.g., RAN data analytics, Virtual network Function (VNF) data analytics, etc.) at different levels (e.g., cross/intradomain). This framework allows for a dedicated data analytic module design at different layers, also enabling cross-layer optimization.

While the UE or subscriber 111 is in the home network HPLMN 110 i.e., before moving to the visited network VPLMN 120, the network node 110B of the home network HPLMN 110 is configured to collect all kind of data information regarding usage pattern(s) of subscriber UE 111 from various radio and core network nodes such as from the core network 110A, and from one or more radio network nodes of the access network 110C of the home network operator. As an example, the data may be collected by the NWDAF and/or IA/ML platform of network node 110B.

According to embodiments herein, the network node 110B is configured to analyze the collected information and filters the collected information so that sensitive information on subscriber UE 111 is no compromised.

For example, the NWDAF and/or IA/ML platform of network node 110B performs "big data analysis" actions, i.e., handle vast amounts of user specific data of the subscriber 111 as the input and produce output that includes only the few most important points about the user/subscriber 111 that are relevant to the categorization. User specific report produced by the NWDAF and/or AI/ML platform of network node 1108 includes digested data points on:

Usage times (e.g., the hour of most heavy data use)
Network/access technology(ies) used (e.g., 4G, 5G SA or 5G NSA)
Service usage (e.g., amount of SMS, MMS, voice minutes used, generic data amount)
Data usage (e.g., generic Internet use vs. most video use)
Video usage (e.g., use of streaming video service vs Teams video vs live IP TV video)
Uplink usage (sending a lot of video from the device/UE or not)
QoS (requested QCI/5G QoS Identifier(s) (501) value(s))
Slicing (generic mobile broadband or something else e.g., WiFi)
Device type and/or model of the UE 111 of the subscriber
Subscription type (Medium, High, VHigh)
etc.

According to embodiments herein, after that the subscriber UE 111 has moved or roamed to the visited network VPLMN 120, the corresponding network node 120B of the visited network 120 is configured to send a request to the core network 110A of the home network 110 requesting data regarding usage pattern(s) of the subscriber 111 that has moved from to the visited network VPLMN 120. The network node 1108 via the core network 110A of the home network HLPMN 110 provides the network node 120B via the core network 120 of the visited network, the requested data information i.e., the analyzed and filtered collected data regarding requested usage pattern(s) of the subscriber 111. Hence, the VPLMN 120 also includes a network node 120B having a corresponding NWDAF and/or IA/ML platform for analysing the data that is received via the core network 110A of the home network 110. The data information may be provided to the VPLMN 120 using standard 5G SA interface such as N32 carrying signalling between 5G core networks. The interface may thus be used to connect together the network nodes 1108 and the network node 120B via respective core network 110 and 120. The data may be exchange using e.g., data structure XML without the nodes actually even knowing the details of other network nodes implementation as long as the network nodes 1108 and 120B can read and understand the data.

The core network 120A of the VPLMN 120 and/or the network node 120B will then adapt core network resources and radio network resources for providing services to the subscriber 111 while in the VPLMN 120. For example, in case of roaming, when the subscriber 111 turns on its smart phone and connects to an operator in the VPLMN 120, the subscriber 111 will have allocated core network resources and radio network access resources that at least similar to those resources allocated/provided by the home network 110 of the subscriber 111 while in the home network 110. This is advantageous for the subscriber 111 to know that the VPLMN 120 can offer the same quality level of services in the VPLM 120 as expected by the subscriber 111.

The HPLMN 10 may potentially sell and/or advertise this kind of "optimal roaming experience" as a value-added service to roamers or include it as a service for their "gold class customers". VPLMN 120 on the other hand would be interested in this information, in order to market itself as "premium network to select when visiting country, A" as well as save network resources for example by dynamically allocating less bandwidth for visiting users that are known to use only little data. In addition, it could be beneficial if VPLMN 120 could gather AI/ML info on how the user or subscriber 111 behaves while roaming and share/sell/advertise it with HPLMN 110, so the data exchange could be bilateral.

It should be mentioned that the embodiments of the present invention are also applicable in 6G network employing AI/ML platform.

Figure 3:
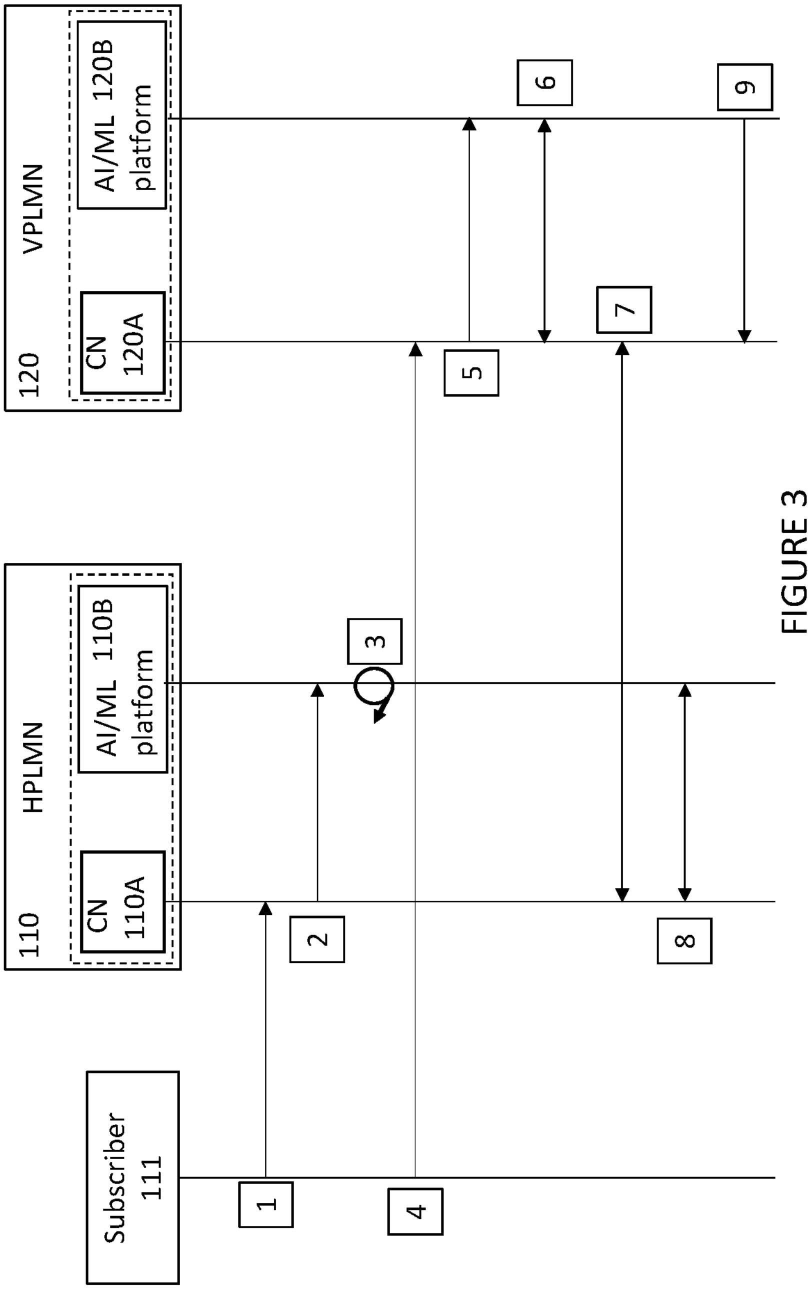
FIG. 3 illustrates a signalling flow diagram employing the teaching of embodiments herein.

Referring to FIG. 3, there is illustrated an example of a signalling flow diagram employing the teaching of embodiments herein, as previously described. It should be mentioned that the signalling diagram is just an example. Details and embodiments previously disclosed are also applicable here.

The numbering in the figure are explained below.

1. Subscriber 111 uses various services in HPLMN 110, in a network such as 5G SA.
2. Core network (CN) 110A forwards usage data and additional information and previously described to network node 1108 comprising a AI/ML platform such as NWDAF. As previously presented, the network node 1108 also receives data regarding usage pattern(s) of a subscriber 111 from a radio network node of a radio access network (RAN) (not shown in FIG. 3 but shown in FIG. 2).
3. Network node 1108 (incl. AI/ML platform) (automatically) analyzes received data, filters out unnecessary info and digests subscribed 111 behavioral patterns into e.g., "heavy video subscriber, consumes a lot of data especially between 21:00 and 23:00, no active gamer so does not require ultra-low latency, no specific requirements for uplink user profile
4. After some time, subscriber 111 travels to another country and attaches to VPLMN network 120.
5. VPLMN CN 120A forwards information about subscriber 111, now active in the network to network node 120B which also comprises a AI/ML platform as in the network node 1108 of the home network 110.
6. Network node 120B (incl. AI/ML platform) notes it does not have any previous information on subscriber 111 and per agreement between HPLMN 110 and VPLMN 120, it sends request to network node 1108 HPLMN to fetch the user profile and additional information.
7. The request may be handled by core networks using standard roaming signaling interface as previously described
8. The request ends up in the network node (incl. the AI/ML platform) 1108 of the HPLMN 110, which sends relevant information about subscriber 111 profile/data, etc. to VPLMN 120 (or to the network node 120B (incl. the AI/ML platform) using the same route via the two CNs 110, 120.
9. VPLMN AI/ML platform or network node 120B may analyses the information it receives and informs CN 120A about subscriber 111 behavior. The core network 120A or the network node 120B itself will then use this information as the basis for performing predictive orchestration of core and radio network resources related to the location where subscriber 111 is active. In other words, the VPLMN 120 by means of the CN 120A or the network node 120B will use the analyses and filtered collected data regarding usage pattern(s) of the subscriber 111, for enabling the network node 120B of the Visited network operator 120 to adapt core network resources and radio network resources for providing service(s) to the subscriber 111 in the Visited network 120.

It should be noted that the analysis of the data collected from the RAN and CN nodes of the HPLMN 110, and also the filtering of the collected data, may be performed by the network node (incl. AI/ML platform) 1108 of the HPLMN 110. In this case the network node 1108 may receive, via the core network (s) 110A and/or 1120A, a request from network node 120B (incl. AI/ML platform) of the VPLMN 120, requesting data regarding usage pattern(s) of the subscriber 111 that has moved from the Home network 110 to the Visited network 120; and the network node 1108 provides the network node 120B of the Visited network operator 120, via the core network 120A, the analysed and filtered collected data regarding requested usage pattern(s) of the subscriber 111, for enabling the network node 120B of the Visited network operator 120 to adapt core network resources and radio network resources for providing service (s) to the subscriber 111 in the Visited network 120.

As previously mentioned, network node 1108 (incl. AI/ML platform (may be part of the core network 110A or be a separate entity/network node, connected to the core network 110A of the HPLMN 110. Similarly, network node 120B may be part of the core network 120A or be a separate entity/network node, connected to the core network 120A of the VPLMN 120.

According to an embodiment, the analysed and filtered collected data provided to the network node 120B of the Visited network operator 120 includes one or more of the following: usage time(s), information on radio access technology(ies), data usage, video usage, uplink usage, quality-of service, slicing network information, and capabilities of a user device of the subscriber. The filtering of the collected may data includes removing subscriber data information considered irrelevant for the Visited network operator 120.

According to another example, the subscriber is informed about the data information provided to the network node 120B of the Visited network operator 120.

Figure 4:
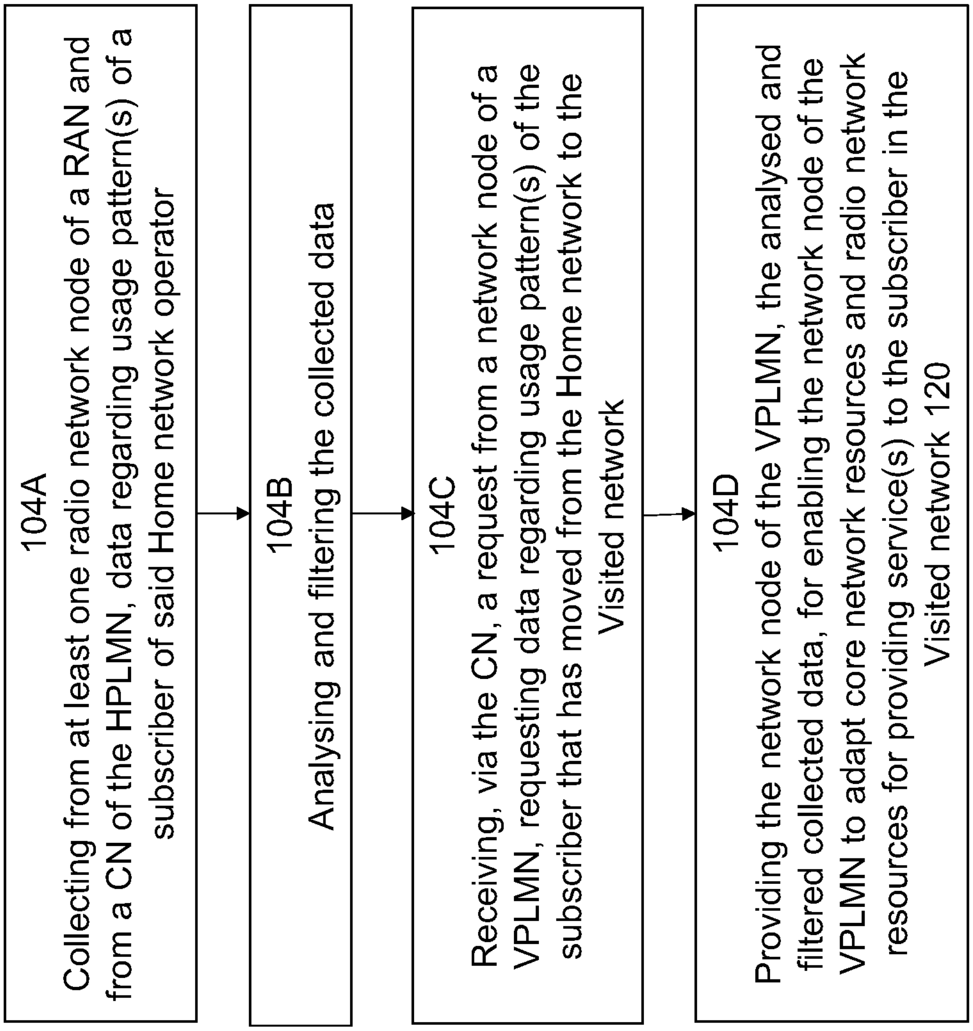
FIG. 4 illustrates a flowchart of a method performed by a network node of a home network operator according to embodiments herein.

Referring to FIG. 4 there is illustrated a flowchart summarizing the main actions of a method performed by the network node 1108 of the Home network operator 110 according to previously described embodiments. The method comprising:

(104A) collecting from at least one radio network node of a radio access network 110C of the Home network operator 110, and from a core network 110A, data regarding usage pattern(s) of a subscriber 111 of said Home network operator 110.

(104B) analysing and filtering the collected data;

(104C) receiving, via the core network 110A, a request from a network node 120B of a Visited network operator 120, requesting data regarding usage pattern(s) of the subscriber 111 that has moved from the Home network 110 to the Visited network 120.

(104D) providing the network node 120B of the Visited network operator 120, via the core network, the analysed and filtered collected data regarding requested usage pattern (s) of the subscriber 111, for enabling the network node 120B of the Visited network operator 120 to adapt core network resources and radio network resources for providing service(s) to the subscriber 111 in the Visited network 120.

Figure 5:
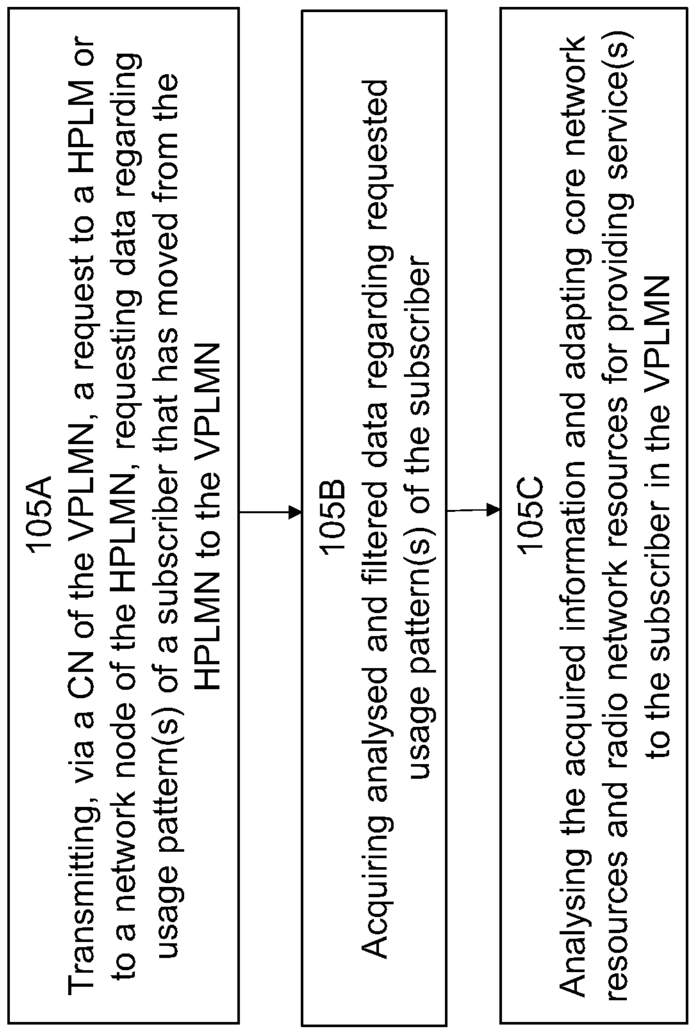
FIG. 5 illustrates a flowchart of a method performed by a network node of a visited network operator according to embodiments herein.

Referring to FIG. 5 there is illustrated a flowchart summarizing the main actions of a method performed by the network node 120B of the Visited network operator 120 according to previously described embodiments. The method comprising:

(105A) transmitting via a core network 120A of the Visited network operator 120, a request to a Home network operator 110 or to a network node 1108 of the Home network 110, requesting data regarding usage pattern(s) of a subscriber 111 that has moved from the Home network 110 to the Visited network 120.

(105B) acquiring analysed and filtered data regarding requested usage pattern(s) of the subscriber, and (105C) analysing the acquired information and adapting core network resources and radio network resources for providing service(s) to the subscriber 111 in the Visited network 120.

According to an embodiment, the network node 120B may provide the subscriber 111 in the Visited network with information on services in the Visited network 120, which services are adapted according to the acquired information on usage pattern(s) of the subscriber111.

Additional details on the actions performed by the network node 120B of the Visited network operator 120 have already been described.

Figure 6:
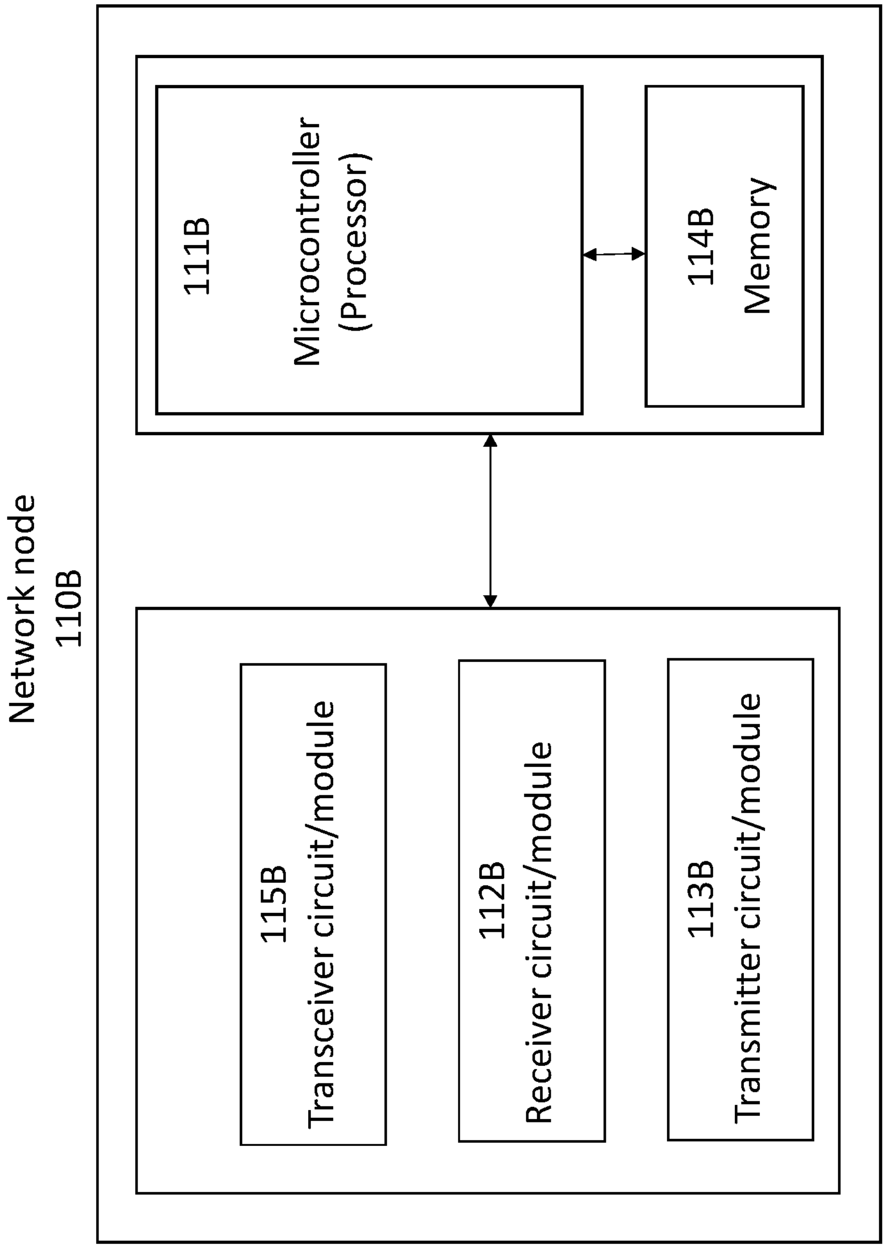
FIG. 6 illustrates a block diagram of a network node of a home network according to embodiments herein.

To perform the method or procedure steps/actions described in connection with FIG. 4 above, a network node 110B is provided as depicted in FIG. 6.

The network node 110B comprises a processing circuit or a processing module or a processor or means 111B, a receiver circuit or receiver module 112B; a transmitter circuit or transmitter circuit 113B; a memory module 114B and a transceiver circuit or transceiver module 115B which may include the transmitter circuit 112B and the receiver circuit 113B. The network node 110B is configured to perform the subject-matter previously described in relation to the actions performed by network node 110B.

The processing module/circuit 111B includes a processor, microprocessor, an application specific integrated circuit (ASIC), field programmable gate array (FPGA), or the like, and may be referred to as the "processor 111B." The processor 111B controls the operation of the network node 110B and its components. Memory (circuit or module) 114B includes a random access memory (RAM), a read only memory (ROM), and/or another type of memory to store data and instructions that may be used by processor 111B. In general, it will be understood that the network node 110B in one or more embodiments includes fixed or programmed circuitry that is configured to carry out the operations in any of the embodiments disclosed herein.

In at least one such example, the network node 110B includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the network node 110B operations disclosed herein. Further, it will be appreciated that the network node 110B may comprise additional components not shown in FIG. 6. The network node 110B comprises a AI/ML platform and a NWDAF as previously described.

There is also provided a computer program comprising instructions which when executed on at least one processor of the network node 110B according to embodiments herein, cause the at least one processor to carry out the method describe above. Also, a carrier containing the computer program is provided, wherein the carrier is one of a computer readable storage medium; an electronic signal, optical signal, or a radio signal.

Figure 7:
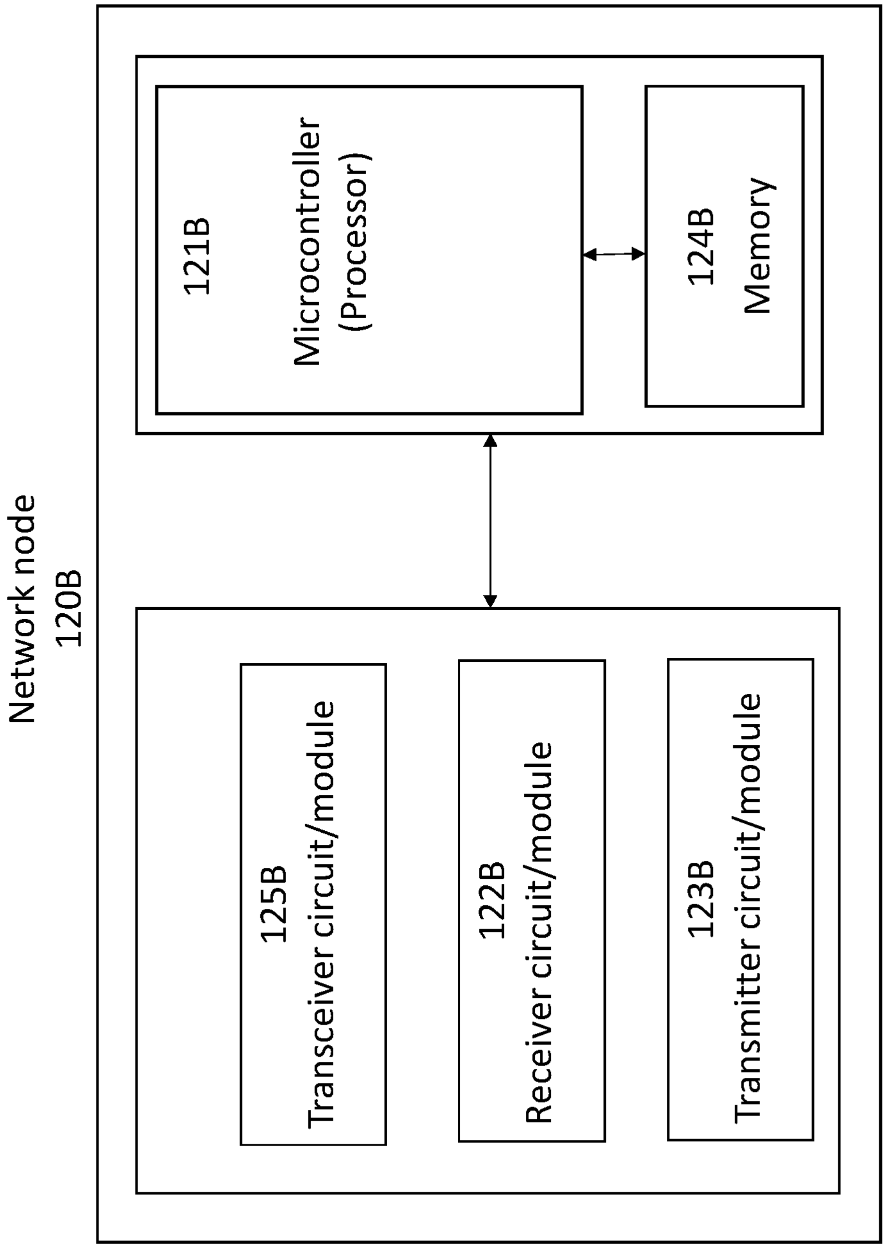
FIG. 7 illustrates a block diagram of a network node of a visited network according to embodiments herein.

To perform the method or procedure steps/actions described in connection with FIG. 6 above, a network node 120B of the Visited network operator 120 is provided as depicted in FIG. 7.

The network node 120B comprises a processing circuit or a processing module or a processor or means 121B, a receiver circuit or receiver module 122B; a transmitter circuit or transmitter circuit 123B; a memory module 124B and a transceiver circuit or transceiver module 125B which may include the transmitter circuit 123B and the receiver circuit 122B. The network node 120B is configured to perform the subject-matter previously described in relation to the actions performed by network node 120B.

The processing module/circuit 121B includes a processor, microprocessor, an application specific integrated circuit (ASIC), field programmable gate array (FPGA), or the like, and may be referred to as the "processor 121B." The processor 121B controls the operation of the network node 120B and its components. Memory (circuit or module) 123B includes a random access memory (RAM), a read only memory (ROM), and/or another type of memory to store data and instructions that may be used by processor 121B. In general, it will be understood that the network node 120B in one or more embodiments includes fixed or programmed circuitry that is configured to carry out the operations in any of the embodiments disclosed herein.

In at least one such example, the network node 120B includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence.

The execution of the program instructions specially adapts or configures the processing circuitry to carry out the network node 120B operations disclosed herein. Further, it will be appreciated that the network node 120B may comprise additional components not shown in FIG. 7. The network node 120B comprises a AI/ML platform and a NWDAF as previously described.

There is also provided a computer program comprising instructions which when executed on at least one processor of the network node 120B according to embodiments herein, cause the at least one processor 121B to carry out the method describe above. Also, a carrier containing the computer program is provided, wherein the carrier is one of a computer readable storage medium; an electronic signal, optical signal, or a radio signal.

An advantage of embodiments herein is to improve user experience of a home subscriber moving from a home network to a visited network.

Another advantage of embodiment of embodiments herein is to provide network node(s) of the home network operator respectively of the visited network operator with an intelligent mechanism to at least determine efficiently the allocation of core network resources and radio network resources for a subscriber moving from the home network to a visited network and vice versa i.e., if a subscriber moves from a visited network to a home network.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from WiFi has been used in this disclosure to exemplify the invention, this should not be seen as limiting the scope of the invention to only the aforementioned system. Other wireless systems, including LTE-A (or LTE-Advanced), 5G, 6G, UMTS and WiMax may also benefit from exploiting the ideas covered within this disclosure.

The invention claimed is:

1. A method performed by a network node of a Home network operator, the method comprising:

collecting, from at least one radio network node of a radio access network, and from a core network, data regarding usage patterns of a subscriber of said Home network operator;

analyzing the collected data and filtering the collected data;

receiving, via the core network, a request from a network node of a Visited network operator, requesting data regarding usage patterns of the subscriber that has moved from the Home network to the Visited network; and providing the network node of the Visited network operator, via the core network, the analyzed and filtered collected data regarding requested usage patterns of the subscriber, for enabling the network node of the Visited network operator to adapt core network resources and radio network resources for providing services to the subscriber in the Visited network and to provide the subscriber in the Visited network with information on services in the Visited network which are adapted according to the analysed and filtered collected data regarding a age patterns of the subscriber.

2. The method according to claim 1, wherein the analyzed and filtered collected data provided to the network node of the Visited network operator includes one or more of the following: usage times, information on radio access technologies, data usage, video usage, uplink usage, quality-of service, slicing network information, and capabilities of a user device of the subscriber.

3. The method according to claim 1, wherein filtering the collected data includes removing subscriber data information considered irrelevant for the Visited network operator.

4. The method according to claim 1, wherein the network node of the Home network operator comprises an Artificial Intelligence/Machine Learning (AI/ML) platform for big data analysis.

5. The method according to claim 1, further comprising informing the subscriber about the data information provided to the network node of the Visited network operator.

6. A method performed by a network node of a Visited network operator, the method comprising:

transmitting via a core network of the Visited network operator, a request to a Home network operator, requesting data regarding usage patterns of a subscriber that has moved from the Home network to the Visited network;

acquiring analyzed and filtered data regarding requested usage patterns of the subscriber; and analyzing the acquired information and adapting core network resources and radio network resources for providing services to the subscriber in the Visited network; and providing the subscriber in the Visited network with information on services in the Visited network, which services are adapted according to the acquired information on usage patterns of the subscriber.

7. The method according to claim 6, wherein the analyzed and filtered data includes one or more of the following: usage times, information on radio access technologies, data usage, video usage, uplink usage, quality-of service, slicing network information, and capabilities of a user device of the subscriber.

8. The method according to claim 6, wherein the network node of the Visited network operator further comprises an Artificial Intelligence/Machine Learning (AI/ML) platform for big data analysis.

9. A network node of a Home network operator comprising a memory and a processor executing instructions from the memory, wherein the network node is configured to:

collect, from at least one radio network node of a radio access network, and from a core network, data regarding usage patterns of a subscriber of said Home network operator;

analyze the collected data and filtering the collected data;

receive, via the core network, a request from a network node of a Visited network operator, requesting data regarding usage patterns of the subscriber that has moved from the Home network to the Visited network; and provide the network node of the Visited network operator, via the core network, the analyzed and filtered collected data regarding requested usage patterns of the subscriber, for enabling the network node of the Visited network operator to adapt core network resources and radio network resources for providing services to the subscriber in the Visited network and to provide the subscriber in the Visited network with information on services in the Visited network which are adapted according to the analysed and filtered collected data regarding usage patterns of the subscriber.

10. The network node according to claim 9, further comprising an Artificial Intelligence/Machine Learning (AI/ML) platform for big data analysis.

11. The network node according to claim 9, further comprising a 5G network data analytics function (NWDAF).

12. A network node of a Visited network operator comprising a memory and a processor executing instructions from the memory, wherein the network node is configured to:

transmit via a core network of the Visited network operator, a request to a Home network operator, requesting data regarding usage patterns of a subscriber that has moved from the Home network to the Visited network;

acquire analyzed and filtered data regarding requested usage patterns of the subscriber;

analyze the acquired information and adapting core network resources and radio network resources for providing services to the subscriber in the Visited network; and provide the subscriber in the Visited network with information on services in the Visited network, which services are adapted according to the acquired information on usage patterns of the subscriber.

13. The network node according to claim 12, further comprising an Artificial Intelligence/Machine Learning (AI/ML) platform for big data analysis.

14. The network node according to claim 12, further comprising a 5G network data analytics function (NWDAF).

* * * * *